(12) United States Patent
Lambert et al.

(10) Patent No.: US 7,538,787 B2
(45) Date of Patent: May 26, 2009

(54) METHOD FOR WRITING A LABEL ON AN OPTICAL DISC

(75) Inventors: Nicolaas Lambert, Eindhoven (NL); Adrianus Johannes Maria Denissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 626 days.

(21) Appl. No.: 10/533,729

(22) PCT Filed: Oct. 14, 2003

(86) PCT No.: PCT/IB03/04550

§ 371 (c)(1),
(2), (4) Date: May 3, 2005

(87) PCT Pub. No.: WO2004/042729

PCT Pub. Date: May 21, 2004

(65) Prior Publication Data

US 2006/0087949 A1 Apr. 27, 2006

(30) Foreign Application Priority Data

Nov. 6, 2002 (NL) .................................. 1021854

(51) Int. Cl.
*B41J 2/435* (2006.01)

(52) U.S. Cl. ..................................... 347/224

(58) Field of Classification Search ................. 347/263, 347/224
See application file for complete search history.

(56) References Cited

U.S. PATENT DOCUMENTS

| 5,608,717 A | 3/1997 | Ito et al. |
| 5,696,505 A | 12/1997 | Schouhamer Immink |
| 6,463,026 B1 * | 10/2002 | Anderson .................... 720/719 |
| 6,771,297 B2 * | 8/2004 | Bronson ..................... 347/224 |

FOREIGN PATENT DOCUMENTS

WO WO0241316 A1 5/2002

* cited by examiner

*Primary Examiner*—Huan H Tran

(57) ABSTRACT

Method for writing a label on a recordable record carrier (1), the record carrier adhering to a predefined, standardized condition with respect to a physical parameter. The method retrieves label information, parameter information on the physical parameter, which parameter information is of a higher precision than the precision of the physical parameter mentioned in the pre-defined, standardized condition (22), and writing the label information on the optical disc using the parameter information (26). The invention further relates to a device for performing the method. Retrieving parameter information on the physical parameter with a higher precision than the precision of the physical parameter mentioned in the pre-defined, standardized condition enables writing such a label without a significant distortion in the label.

13 Claims, 8 Drawing Sheets

Figure 1:
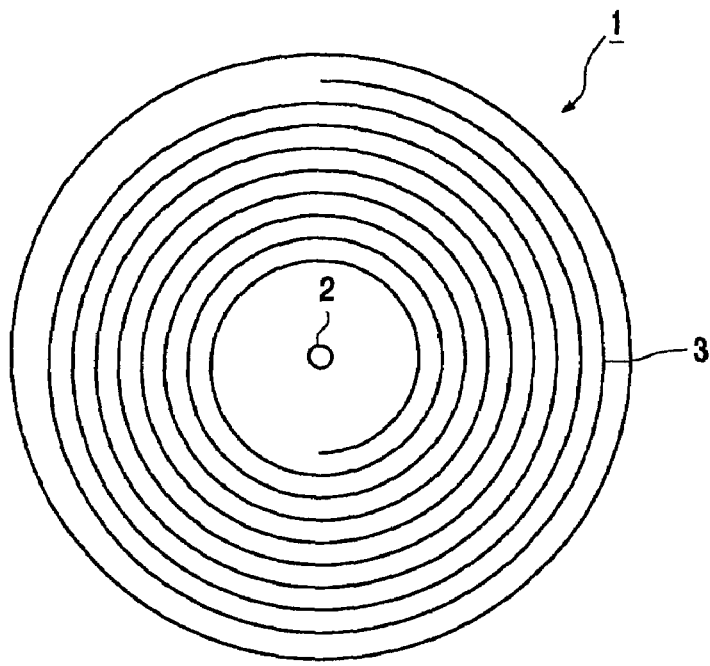

| Parameter | Nominal value | Range | Unit | Remarks |
| --- | --- | --- | --- | --- |
| Starting diameter of the Data area $D_0$ | 48.0 | + 0.0, - 0.4 | mm | |
| Track pitch $D_{tp}$ | 0.74 | ±0.01 | µm | averaged over whole disc |
| | 0.74 | ±0.03 | µm | maximum deviation |
| Channel bit length $L_{cb}$ | 133.3 | ±1.4 | nm | averaged over whole disc |

FIG. 9

| Parameter | Nominal value | Range | Unit | Remarks |
| --- | --- | --- | --- | --- |
| Inner radius $R_0$ | 22.0 | | mm | start of groove tracks, start of Lead-in |
| | 24.0 | + 0.0, - 0.2 | mm | first address in Information/Data Zone |
| Track pitch $D_{tp}$ | 0.74 | ±0.01 | µm | averaged over the Information Zone |
| | 0.74 | ±0.03 | µm | maximum deviation |
| Channel bit length $L_{cb}$ | 133.3 | ±1.4 | nm | averaged channel bit lenght over each RUN |

FIG. 10

METHOD FOR WRITING A LABEL ON AN OPTICAL DISC

The invention relates to a method of writing a label on a recordable record carrier, the record carrier adhering to a pre-defined, standardized condition with respect to a physical parameter. The invention further relates to a device for performing the method.

In order to be able to identify and find a particular record carrier, it is necessary that the user of these record carriers consistently labels his otherwise anonymous record carriers before or after recording. In general, the average user does not do this very diligently. In order to overcome this problem, it would be convenient if a label can be written during the recording of the information on the record carrier. However, a standardized record carrier has as a drawback that a known standard drive for recording data is not suitable for writing a visible label on it. In order to be able to write a label on a record carrier, it is crucial to know exactly where the written visible image pixels data making up the label end up on the record carrier area, as the pixels must be written in a two-dimensionally coordinated way. A standard drive is not capable of determining this.

A recordable record carrier as mentioned above is well known, for example from the standardized rewritable and/or recordable optical record carriers CD-R, CD-RW, DVD+R or DVD+RW. The information on this type of record carriers is written in a continuous clock-wise spiral from the inner radius to the outside radius. The documents in which these standardized optical record carriers are described (so-called standard specifications) specify conditions with respect to physical parameters these record carriers must adhere to, like for example the inner radius, the track pitch and the channel bit length. The value of these parameters is sometimes also stored on the record carrier, for example in a lead-in area.

It is an object of the invention to realize a method for writing a label on a recordable record carrier in an improved way.

According to the invention, this object is achieved by a method that is characterized in that the method comprises the following steps:
retrieving label information,
retrieving parameter information on the physical parameter, which parameter information is of a higher precision than the precision of the physical parameter mentioned in the pre-defined, standardized condition,
writing the label information on the record carrier using the parameter information.

The inventors have recognized, inter alia, that due to fact that the standard specifications for recordable and rewritable media only specify this physical parameter to a certain precision, small errors in this parameter will cause a significant distortion in the label written on the record carrier. An apparently insignificant inaccuracy in such a physical parameter will thus have large consequences for the label writing process. The inventors indeed found that due to this, a label in the form of a block got warped into a hardly recognizable spiral pattern. From this the inventors have drawn the conclusion that a more accurate indication of certain physical parameters was needed. These physical parameters can be used by a standard drive for determining the entire mapping of the channel bits over the record carrier and thus also for determining where the written visible image pixels data making up the label end up on the record carrier.

A preferred embodiment of the method according to the invention, wherein the record carrier has a circular form is characterized in that the method further comprises the step of converting the label information to a polar format. By converting the label information to a polar format, distortion of the label to be written on the circular record carrier can be prevented, and conversion of the image into a regular data stream can be speeded up.

A further embodiment of the method according to the invention is characterized in that the method further comprises the step of converting the label information into a regular data stream. This has as an advantage that the writing of the label on the record carrier can be performed relatively fast and the total time of writing the actual data and the label on the record carrier is then dominated by the write speed, and is thus not hindered by the separate writing of the label information.

A further embodiment of the method according to the invention is characterized in that the parameter information on the physical parameter is retrieved by reading out the information, e.g. by reading it out from the record carrier itself.

These embodiments have as an advantage that the parameter information can be read out fast and reliable. The parameter information can e.g. be stored in the lead-in area of the record carrier, e.g. by storing the parameter information in the pre-pits or in the wobble, techniques that are known from the (re)writable record carriers DVD-RW and DVD+RW. It is also possible to store the parameter information in an integrated circuit present on the record carrier.

In a further embodiment, the record carrier comprises a unique identifier, e.g. a number, and the method is characterized in that the parameter information on the physical parameter of the record carrier is retrieved by: reading out the unique identifier, and by reading out the parameter information from a database using the unique identifier, e.g. by reading it out via the Internet. This embodiment has as an additional advantage that the parameter information can be stored in the database after the production of the record carrier to which the parameter information relates. It is thus possible to verify and change the parameter information.

In a further embodiment of the method according to the invention, the parameter information is retrieved by performing measurements on the record carrier. This embodiment has as an advantage that the information on the physical parameter can be retrieved in the absence of this information on the record carrier. Although retrieving this information by performing measurements can be more time consuming than by reading it out, e.g. from the record carrier, it is very reliable and independent of other methods or services and it is unlikely that incorrect information is used for writing the label.

In a further embodiment of the method according to the invention, the measurements comprise angle measurements, in particular angular distance measurements and that the information on the physical parameter is retrieved by fitting to the angular distance measurements. Using angular distance measurements has as an advantage that the method can be performed by many standard record carrier drives; the functions required for performing the angular distance measurements are already present in these drives. Fitting the angular distance measurements results in accurate parameter information.

In a further embodiment of this method, the angular distance measurements are based on tacho information or on timing measurements. Using timing measurements has as an advantage that the method is independent of any tacho hardware. Angular distance measurements are insensitive to constant service delays and other sources of measurement error.

In a preferred embodiment of this method, the eccentricity of the record carrier is determined and the angular distance measurements are based on the eccentricity. This method relates to a circular record carrier which rotates about an axis, and on which tracks are provided for containing data, said tracks being wound round a center. Eccentricity arises when the axis and the center do not coincide. Using this eccentricity angle information concerning, for example, the position of a certain data block on the record carrier can be retrieved. This angle information can be used in the angular distance measurements.

The invention further relates to a device for performing these methods according to the invention.

These and other aspects of the invention are apparent from and will be elucidated with reference to the embodiments described hereinafter.

IN THE DRAWINGS

Figure 2:
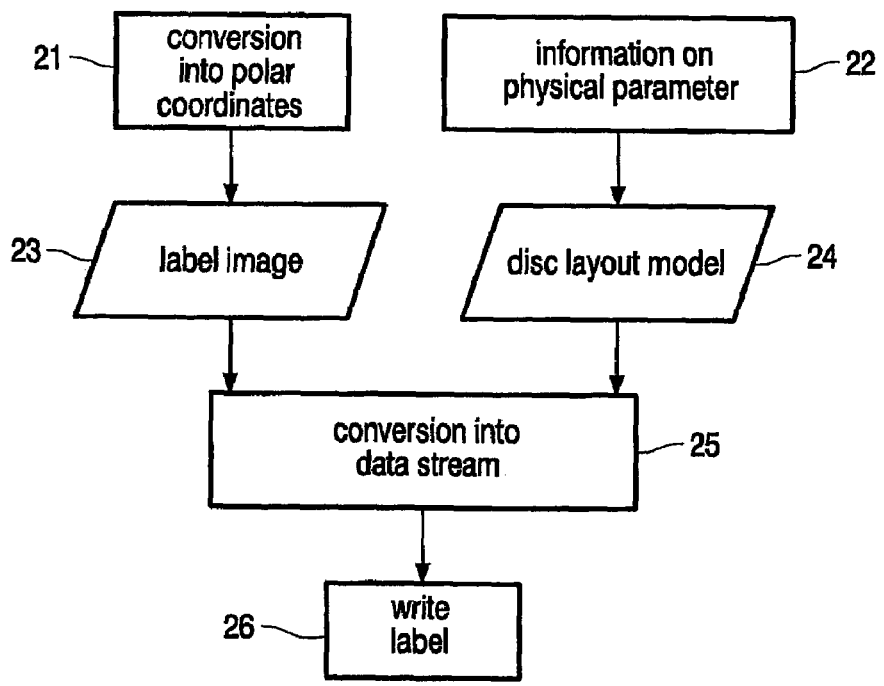
Figure 3A:
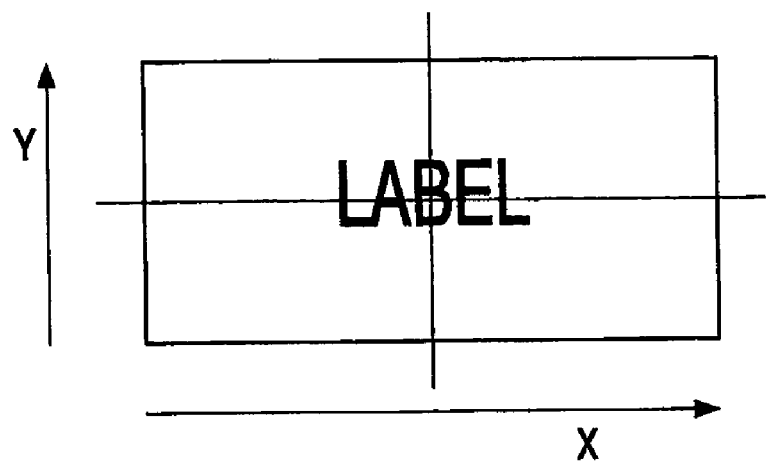
Figure 3B:
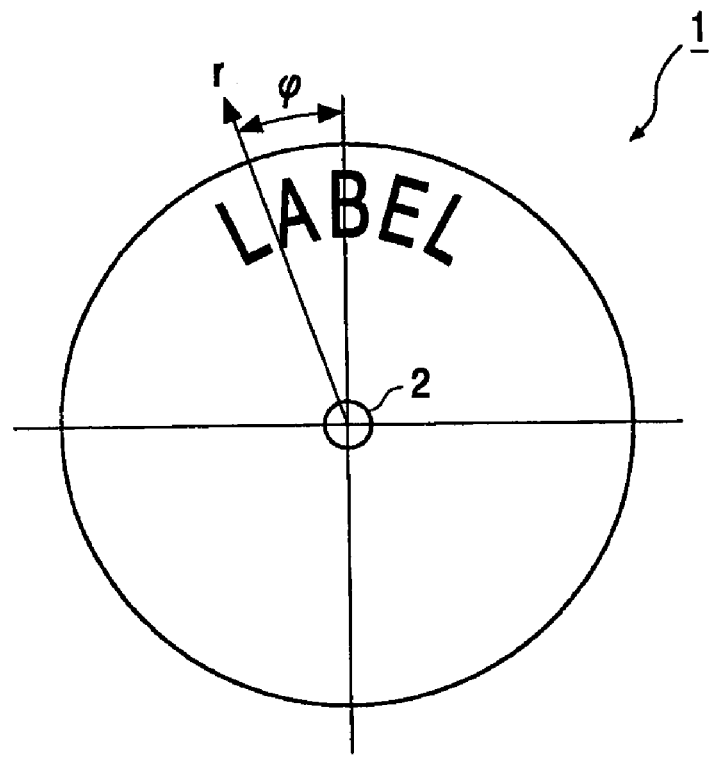
Figure 4:
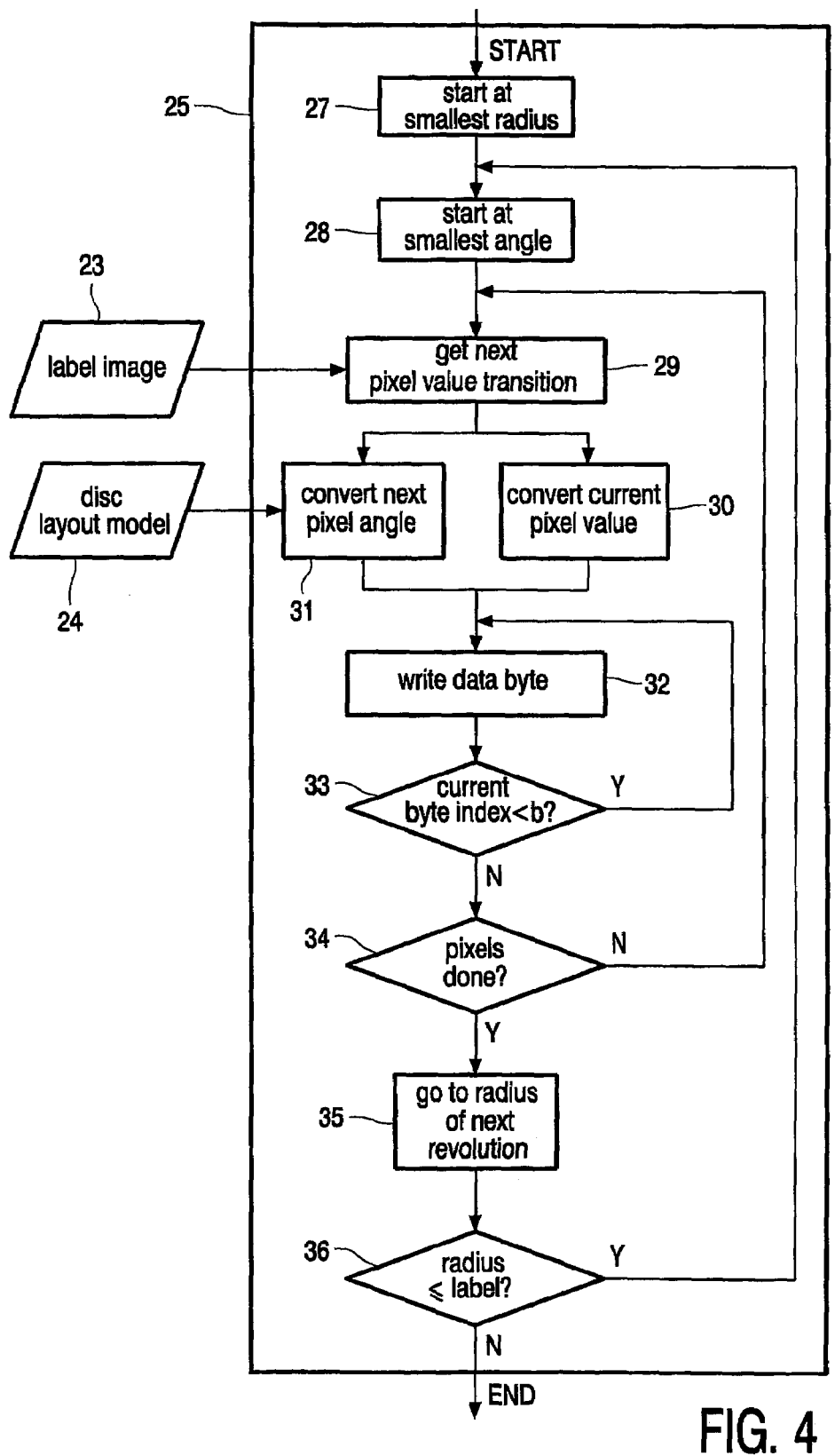
Figure 5:
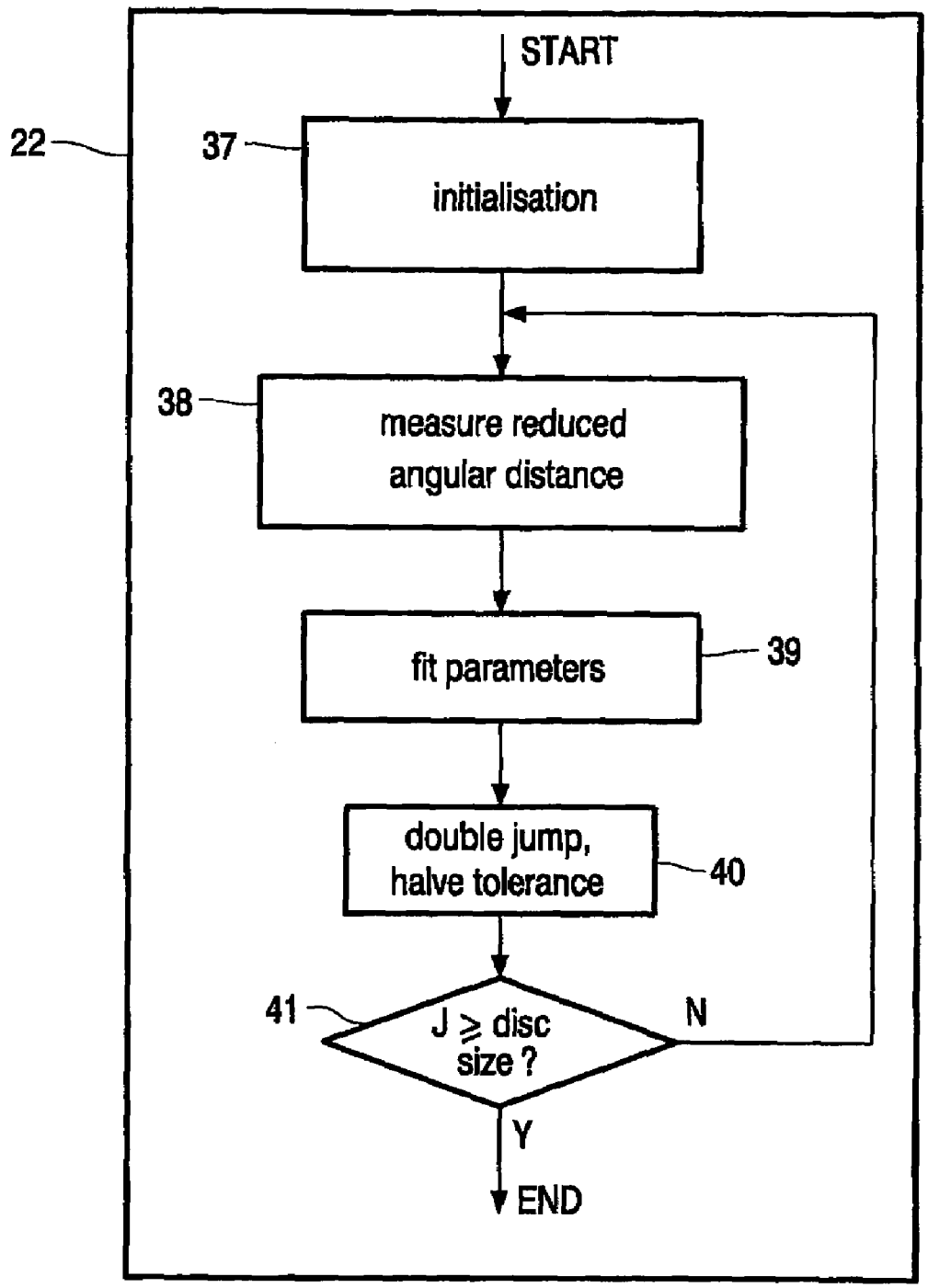
Figure 6:
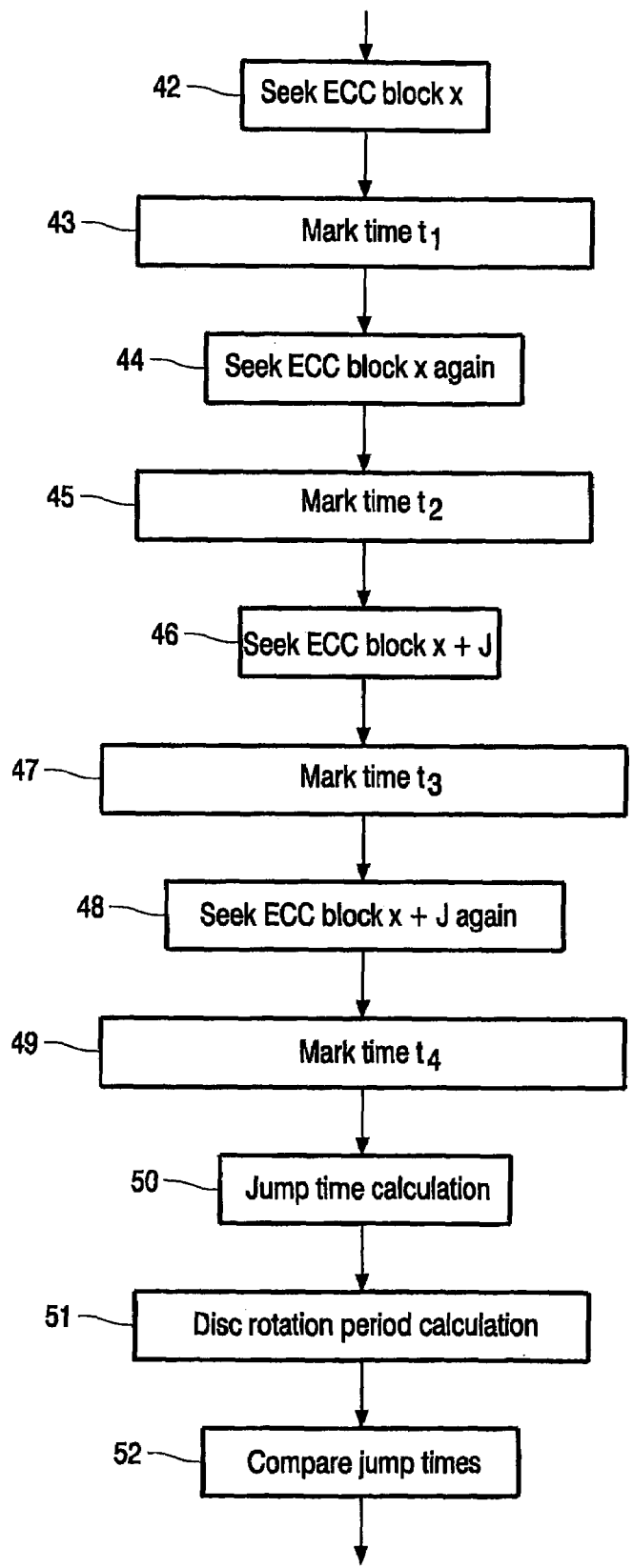
Figure 7:
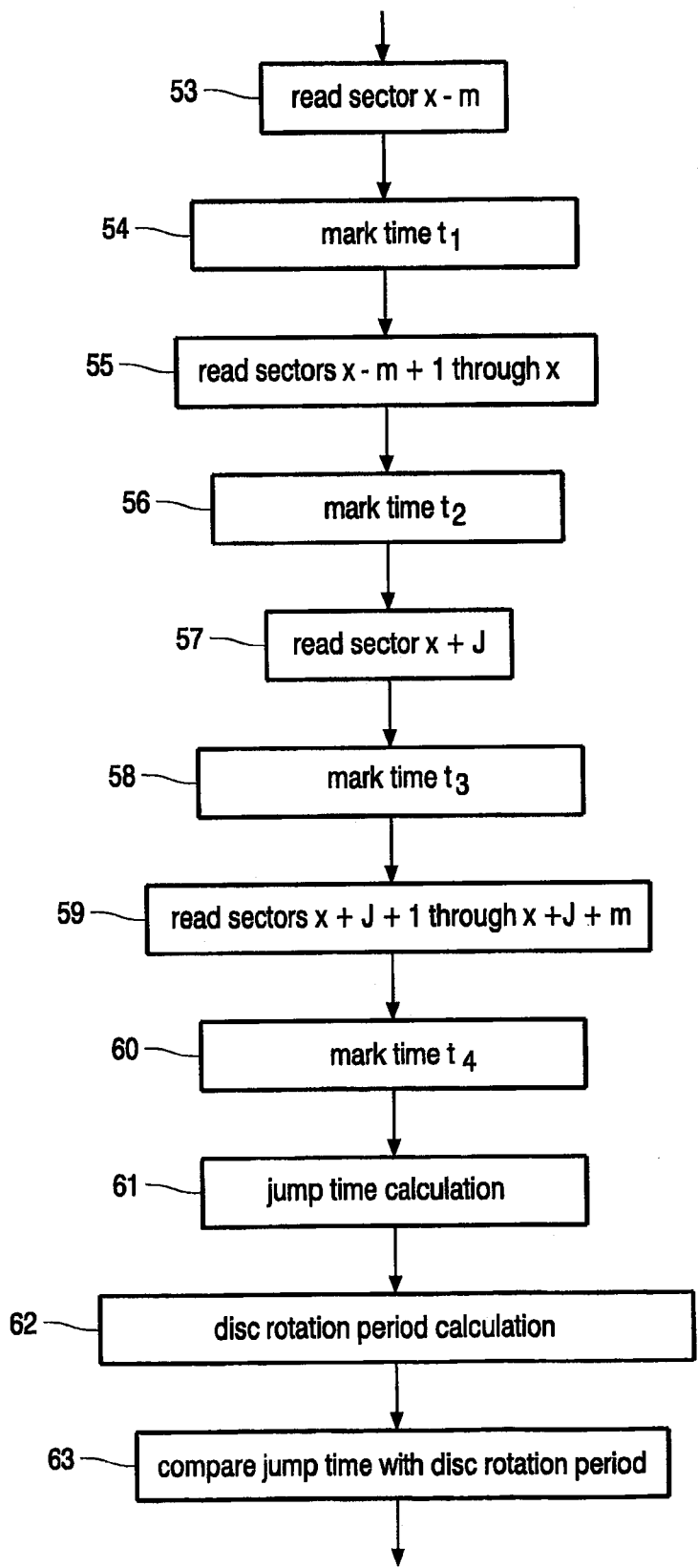
Figure 8:
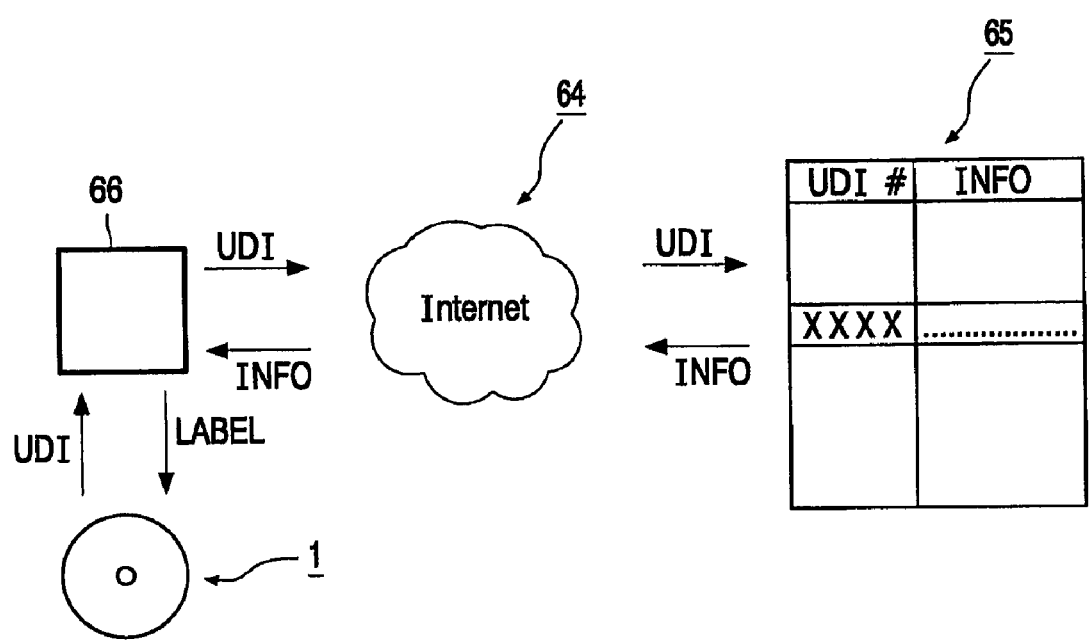

FIG. 1 shows a recordable record carrier,

FIG. 2 shows a flow diagram of the first embodiment of a method according to the invention, FIG. 3 shows an example of the visible label, which can be written on the record carrier using the method according to the invention, FIG. 4 shows a flow diagram of a method to convert the label information into a regular data stream to the disc, FIG. 5 shows a flow diagram of the second embodiment of the method according to the invention in which the information on the physical parameters is retrieved from reduced angular distance measurements, FIG. 6 shows a flow diagram of the third embodiment of the method in which the reduced angular distance measurement are based on timing measurements, FIG. 7 shows a flow diagram of an alternative embodiment of the method in which the reduced angular distance measurements are based on timing measurements, FIG. 8 shows schematically an embodiment of the method according to the invention in which the information on the physical parameter is retrieved by reading out the information via the Internet, FIG. 9 shows a table comprising parameter tolerances for a DVD-RW disc, FIG. 10 shows a table comprising parameter tolerances for a DVD+RW disc.

FIG. 1 shows a recordable record carrier 1, for example a DVD+RW like disc, having a central aperture 2 and an information area 3. The information to be stored on these recordable optical media is written in a continuous clock-wise spiral from the inner radius to the outside. The first part of the data area is reserved as lead-in area with various special purposes. After that comes the usable data area, which in turn is followed by a lead-out area. When recording a record carrier, some parts of the lead-in area are updated, the data area is written, and after the last valid data area a lead-out area is written. As mentioned above, in order to be able to write a visible image on the record carrier, it is crucial to know exactly where written data end up on the information area 3.

In order to know where the channel bits end-up on the information area 3, it is necessary to analyze the way a standardized record carrier is defined. Recordable and rewritable media are mastered with a groove and sector address indication (e.g. in the rewritable DVD+RW disc a wobbling groove is used for sector address indication; in the recordable DVD-R disc pre-pit information relating to the sector address is present in the land). The standard specification for these media generally prescribes the physical layout in terms of inner radius $R_0$, track pitch $D_{tp}$ and channel bit length $L_{cb}$, but does not define the details of the disc mastering. The inner radius $R_0$ is the radius on a record carrier at which the information area begins. The information area normally comprises three areas, the lead-in area, a data recording area and a lead-out area. The track pitch $D_{tp}$ is the distance between adjacent tracks measured in the radial direction. The channel bit length $L_{cb}$ is the unit length T of a channel bit. For example in DVD, the minimum recording pit length is equal to three times the channel bit length, 3T, and the maximum recording pit length is equal to eleven times the channel bit length, 11T. Given these parameters, however, it is in principle possible to deduce the entire mapping of the channel bits over the record carrier, if it is assumed that the data density is exactly uniform over the disc, i.e. a spiral with perfectly constant track pitch $D_{tp}$, and channel bit length $L_{cb}$, and that starts exactly at inner radius $R_0$. For a spiral, the radius r grows with a single track pitch $D_{tp}$ for every revolution, so r simply depends linearly on the cumulative angle $\Phi$:

$$r(\Phi)=R_0+D_{tp}\Phi/2\pi$$

By integrating along the track length, we find the relation between bit string position l and the cumulative angle $\Phi$:

$$lL_{cb}=\int r(\Phi)d\Phi=\int(R_0+D_{tp}\Phi/2\pi)d\Phi=R_0\Phi+D_{tp}\Phi^2/4\pi$$

Solving for $\Phi$ yields:

$$\Phi(l)=2\pi\{\sqrt{(lL_{cb}D_{tp}/\pi+R_0^2)}-R_0\}/D_{tp}$$

and $$r(l)=\sqrt{(lL_{cb}D_{tp}/\pi+R_0^2)}$$

The problem is that the inner radius $R_0$, track pitch $D_{tp}$ and channel bit length $L_{cb}$ are known only to a certain precision. This is indicated in FIGS. 9 and 10, which shows a table comprising parameter tolerances for a DVD-RW disc and for a DVD+RW disc respectively. For the radius r(l) this is not always a problem, as the specified precision is sufficient for most practical purposes. Small relative errors in $\Phi(l)$, however, give rise to disastrous errors in the reduced angle $\phi$:

$$\phi(l)=\Phi(l)\mod 2\pi.$$

E.g. a DVD disc uses more than 40.000 revolutions from the inner radius to the outer radius. Hence a relative error of 1% in $\Phi(l)$ corresponds to more than 40000% error in $\phi(l)$: a 1% error in $\Phi(l)$ causes the label image to be rotationally warped over more than 400 revolutions! The problem is of course that a tiny miscalculation of the data length per revolution accumulates to a huge error after 40000 revolutions. In experiments, the inventors found indeed errors of this magnitude: a nominal block pattern in the radius r(l) looks perfectly all right, but a nominal 180° block pattern in the reduced angle $\phi(l)$ gets warped into a hardly recognizable spiral pattern. From this the inventors drew the conclusion that more accurate information on the physical parameters used for determining the position of the data pixels is needed.

Closer inspection of the equation for $\Phi(l)$ shows that the three constants $R_0$, $D_{tp}$ and $L_{cb}$ result in only two media master specific parameters A and B:

$$\Phi(l)=\sqrt{(Al+B^2)}-B$$

with $$A=4\pi L_{cb}/D_{tp}$$

$$B=2\pi R_0/D_{tp}$$

A more intuitive explanation for a two parameter description is that the linear spiral can be defined by the amount of data that is written in the first revolution of the track, and the fixed growth of that amount per revolution (this leaves the scale of the spiral as a third parameter, but the scale does not affect the rotational warp and therefore does not have to be known at great precision). This simple two parameter problem can give rise to rather spectacular but undesirable warp patterns when the parameters are slightly off. Experiments showed that several iterations in the visual calibration procedure are needed to achieve the required sub-ppm precision in A and B for less than 1 mm distortion in the visible label.

FIG. 2 shows a flow diagram of the first embodiment of a method according to the invention.

FIG. 3 shows an example of the visible label, which can be written on the record carrier using this method. After selecting the label (depicted in FIG. 3A) to be written on the (in this embodiment circular) record carrier, the label is converted into polar coordinates in step 21. The parameters of the pixel values in polar co-ordinates can be expressed in radius r and angle φ, as indicated in FIG. 3B, for a simple case. For a true rectangular mapping more processing is needed. This is performed in step 23. Before, during or after the conversion step 21, the information on the physical parameter, which is used for writing the label, is retrieved in step 22. Particular embodiments on how this information is retrieved can be found with reference to FIGS. 5 to 8 in which preferred embodiments of the method according to the invention are described. Using this information, it can be calculated at which radius r and angle φ a certain byte is written. This is performed in the model at stage 24. After the pixel values are expressed in polar coordinates and after the byte indices for the polar coordinates for the different byte indices are calculated, the label information can be converted into a regular data stream in step 25. An embodiment of converting the label information into a regular data stream is shown with reference to FIG. 4. After this conversion into a regular data stream, this data stream can be written on the record carrier, thereby writing the label on it, in step 26. If this embodiment of the method according to the invention is implemented efficiently, the processing in all these procedures can be relatively fast and total time is dominated by the write speed to disc. In the case of circular optical discs, the information on the physical parameters (e.g. track pitch, channel bit length or starting radius) is specific for the master used for making the optical disc that the label will be written on. In principle this information could be provided by the disc manufacturer on the disc, or retrieved from a database, or measured through an independent method in an optical drive. An embodiment of the latter method is described with reference to FIG. 5.

FIG. 4 shows a flow diagram of a method to convert the label information into a regular data stream to the disc. In this method it is assumed that label information is provided in a suitable polar format, depicted in block 23, and that an accurate model of the physical sector layout of the disc to be written is available to the drive, depicted in block 24. By anticipating the disc drive's scrambling, coding and physical format, the method can generate a regular data stream that represents the visible label. The optical disc drive's sector addressing mechanism combined with physical sector layout model of the disc at hand make sure that the label is written at the intended positions. This can be understood as follows. Using information on the label image 23 and the disc layout model 24, the method depicted in FIG. 4 is started at the smallest radius 27. At this radius, the method is started at the smallest angle Φ 28. Using information on the label image 23, the next pixel value transition of the label to be written is retrieved in step 29. This current pixel value is then converted into a visible channel symbol in step 30; and using the disc layout model 24, the next pixel angle Φ is converted to byte index b in step 31. After that, the channel symbol is converted into a data byte and written on the record carrier in step 32. In step 33 it is then checked whether the current byte index b is already equal to or larger than the byte index b of the next picture angle ø. If this is the case, it is checked in step 34 whether all pixels at this radius are processed. If this is also the case, the method is repeated for the radius of the next revolution in step 35. The method is ended if the radius reached falls outside the position of the label written on the record carrier, step 36.

An example of how a block of user data is translated into a block of channel symbols is explained for DVD. The DVD standard defines how a block of user data is translated into a block of channel symbols. On CD different coding schemes are used, but the situation is very similar. In DVD, data is physically accessed in units of an ECC block that corresponds to 32 Kbytes of user data and 16*(12+1)*(172+10+2*2) channel symbols. This can be understood as follows.

Inside the ECC block are 16 equally spaced physical sectors of 2 Kbytes of user data and (12+1)*(172+10+2*2) channel symbols. The 2 Kbytes of user data in the physical sector is XORed with a scrambling sequence that depends on bit 7-4 of the sector ID number (the first physical sector of the data area after the lead-in has number 0x30000) (or, identically, bit 3-0 of the ECC block number). The resulting symbols are headed with a 12 Byte sector identification header and tailed with a 4 Byte Error Detection Code at the end. The resulting 12+2048+4=2064=12*172 symbols are split up in 12 rows of 172 symbols in the physical sector. As explained below, this explains the presence of the terms 12 and 172. Each physical sector consists of 12+1=13 rows of (172+10+2*2) channel symbols. The first 12 rows contain the 12*172=12+2048+4 symbols above. The last of the 13 rows consists of outer-code parity information. The outer-code parity information is assembled over the entire ECC block, but a row interleaving scheme distributes that information equally per physical sector. So physical positions are regular on a per sector basis. The last 10 symbols of each row consist of inner-code parity information, hence the term 10. Each half row starts with two SYNC symbols, hence the term 2*2. By anticipating the (sector ID dependent) scrambling sequence, it is possible to directly control 2048 of the (12+1)*(172+10+2*2)=2418 symbols of a physical sector. The other 18% of the symbols for ECC, SYNC and header information are controlled by the standard. This 18% we simply take for granted as "pollution" of our visible label image.

In DVD, a certain coding scheme (usually called EFM+, e.g. known from U.S. Pat. No. 5,696,505—PHN 14.746) is used for translating a channel symbol into 16 channel bits from a restricted code set. This translation involves several complications. Symbols are defined by transitions. Whether the sequence starts with a pit or not is immaterial for the code (but may affect track-to-track correlation and therefore visibility). Since all intermediate header and ECC information is defined by the standard, it might be possible to pre-anticipate this and make the pattern pit-phase consistent. Since we found we could not control the track-to-track position to sufficient accuracy anyhow, we did not pursue this approach. The channel bit stream is run length limited between 2 and 10 zeroes (all features are 3 to 11 channel bits long). To enforce the above requirement and a DC-free signal, a further symbol-to-symbol state control is used with 4 possible states, corresponding to 4 different channel word possibilities for each symbol. This mechanism complicates matters but is still fully determined by the standard. In addition for symbols 0 to 87 a substitution table may also be used in an attempt to make the code more DC-free. The drive is free to adopt different strategies here. These restrictions severely limit our possibilities in selecting codes for visibility of the label to be written on the DVD disc. Nevertheless it turns out that the combination of pre-anticipating the scrambling, and selection of a few well-behaved symbols from the modulation table, results in a visible effect on the disc. Also repeated multi-symbol sequences are possible with similar results. E.g. a repeated symbol 111 quickly stabilizes on a 1064 nm period pit pattern (repeated i4 pattern), and repeated symbol 146 to a 2128 nm period pit pattern (depending on previous state either repeated i8 pattern, or repeated i6-i10 pattern). In fact, a test showed that any of the 256 data symbols leads to interference colors when used in simple repeated single symbol pattern. Some symbols result in very similar results. Additional information on strategies on selecting the most suitable channel words can be found in the prior art, e.g. in U.S. Pat. No. 5,608,717 or in WO 02/41316 A1 (PH-NL010604).

FIG. 5 shows a flow diagram of the second embodiment of the method according to the invention in which the information on the physical parameters retrieved from reduced angular distance measurements. Angular distance between two sectors is defined here as the spiral angle between the two sector headers, in other words the angle between the two physical sector header locations viewed from the centre of the disc. The term "reduced" is used here to indicate an angle between 0 and a full revolution, disregarding any additional spiral revolutions along the spiral track between the two sectors. The term "cumulative" on the other hand includes all those spiral revolutions.

In this embodiment, initial model parameters, a parameter tolerance window and a jump distance are used, depicted in block 37. These parameters are such that the model predicts the angular distance for the jumps with better than half a revolution accuracy. This permits reliable fitting to the reduced angular distance measurements, because local optima corresponding to one or more revolutions of mismatch are avoided. In step 38, the reduced angular distance for a number of jumps scattered over the disc area are measured and suspected measurements are discarded. In step 39, the physical parameters are fitted within the parameter tolerance window to these measurements. This fit results in more accurate information on the physical parameters (e.g. the track pitch or the channel bit length). For each successive iterative loop, the jump distance is doubled and the tolerance window is halved, step 40, keeping the next fit again reliably restricted to the global optimum. The method is ended in the case the jump distance J exceeds disc size, step 41. The values of the physical parameters thus acquired are used for writing the label on the record carrier. Depending on the accuracy and number of measurements, it may take up to a few minutes to execute sufficient iterations. The reduced angular distance measurements can be based on tacho information, or on timing measurements. Timing measurements are explained further with reference to FIG. 6 and FIG. 7.

FIG. 6 shows a flow diagram of the third embodiment of the method in which the reduced angular distance measurement are based on timing measurements. In this method the reduced angular distance between two ECC blocks is obtained through timing measurements. It is a possible implementation of the measurement procedure depicted in block 38 in FIG. 5. The jump time between the two ECC blocks $T_{jmp}$ is measured and compared in modulo fashion with the disc rotation period $T_{rot}$. The disc rotation period $T_{rot}$ is measured by accessing the same ECC block twice, for both ECC block x and ECC block x+J, and taking the average. The time marks can reference the moment that the ECC block header passes by inside the drive, or the finish of a successful uncached read request. In the last case, the measured angle corresponds in fact to the end of the sectors, i.e. the start of the next sector. Since the method uses time differences, it is insensitive to constant service delays. In practice, the accuracy of this method is only limited by the reproducibility of the service time of the disc drive. In detail this method is performed as follows. In step 42, ECC block x is sought. In step 43, time $t_1$ when ECC block x passes by is marked. In step 44, ECC block x is sought again. In step 45, time $t_2$ when ECC block x passes by is marked. In step 46, ECC block x+J, J being the jump distance, is sought. In step 47, time $t_3$ when ECC block x+J passes by is marked. In step 48, ECC block x+J is sought again. In step 49, time $t_4$ when ECC block x+J passes by is marked. In step 50, the jump time $T_{jmp}$ is calculated from the difference between $t_3$ and $t_2$. In step 51, the disc rotation period $T_{rot}$ is calculated from $((t_2-t_1)+(t_4-t_3))/2$. In step 52 finally, the jump time between ECC block x and ECC block x+J is compared in modulo fashion with the disc rotation period $T_{rot}$.

FIG. 7 shows a flow diagram of an alternative embodiment of the method in which the reduced angular distance measurements are based on timing measurements. In this method reading the same ECC block twice is avoided, and the method thus avoids read caching. Parameter m is a small integer constant, e.g. m=8. The disc model provides estimated angular size $\Delta\Phi_x$ of ECC block x and $\Delta\Phi_{x+J}$ of ECC block x+D. Disc rotation period is now derived by reading m contiguous ECC blocks and division by the estimated angular size of ECC blocks as provided by model. The time marks reference the finish of a successful read request. It is important that the time needed to read m sectors ($t_2-t_1$ and $t_4-t_3$) corresponds to the actual media read-out: interface speed must not be limiting. In detail, this method is performed as follows. In step 53, sector x−m is read. In step 54, time t1 when finished reading this sector is marked. In step 55, sectors x−m+1 through x are read. In step 56, time t2 when finished reading sector x is marked. In step 57, sector x+J is read. In step 58, time t3 when finished reading this sector is marked. In step 59, sectors x+J+1 through x+J+m are read. In step 60, time t4 when finished reading sector x+J+m is marked. In step 61, the jump time $T_{jmp}$ is calculated from the difference between $t_3$ and $t_2$. In step 62, the disc rotation period $T_{rot}$ is calculated. In step 63 finally, the jump time is compared in modulo fashion with the disc rotation period $T_{rot}$.

With reference to FIG. 6 and FIG. 7, an algorithm to fit position parameters to timing measurements is described. In the preferred embodiments of FIG. 6 and FIG. 7, the sector layout of a record carrier is determined by using timing. Similarly, tacho-angle measurements can be used in very similar way.

The basic approach for gaining angular information out of timing measurements is as follows. When a read command is issued, the drive has to move the head to the appropriate track and wait for the requested sector to pass under the head. We will use requests in units of ECC-blocks to achieve the best lock to the physical storage. We assume that there is a fixed delay between actual reading of the data from the media, and the point in time where the drive signals successful termination of the read request. I.e. we assume that the drive is actually reading the data from the media (and not using data from the read-cache), that the data is transferred to the host as soon as available, and that all the intermediate electronics and software latencies are sufficiently regular in time. This means we link the termination time of a read command to the rotational phase of the end of the last requested ECC-block. If we assume that the rotation of the disc is sufficiently constant, we relate the termination times of a sequence of read requests to the relative reduced angles between the ends of the associated ECC-blocks.

The first problem is to determine the rotation period of the disc. For a drive in CAV mode, the rotation period will be stable after initial spin-up and independent of the ECC-block address. So we simply issue a couple of read commands to spin-up the disc and it is made sure that the servo has fully recovered from spin-up. If we can make sure that the disc does not use its read cache, a simple repetition of reading the same ECC-block over and over again gives us a series of termination time stamps that are exactly one rotation period $T_{rot}$ apart. Taking the median of several measured periods will help in obtaining better accuracy while avoiding the effect of spurious extra rotations that may be triggered by read problems, or occasional delays in the host computer. If the read cache cannot be switched off we can follow a different strategy. The two parameter position model has even based on the values from the standard already an accuracy of a few percent accuracy in the calculated total angle $\Phi$. So by reading ECC-block x (mark termination time as $t_0$) and subsequent ECC-blocks x+1 through x+n (mark termination time as $t_n$) we can find the rotation period as $T_{rot}=2\pi(t_n-t_0)/(\Phi_{n+1}-\Phi_1)$.

We divided by the difference in calculated ending angles $\Phi_1$ and $\Phi_{n+1}$ rather than by starting angles $\Phi_0$ and $\Phi_n$, but that has no practical significance. We assumed that the data transfer mechanism to the host can handle the maximum data transfer speed of the media itself. If needed, it is relatively easy to re-adjust the rotation period as part of the model parameter fit-procedure.

Now that we know how to measure the rotational period we can start measuring the reduced angle between two ECC-blocks. We first read ECC-block a and mark the termination time $t_a$, then jump and read ECC-block b and mark the termination time $t_b$. The reduced angle between the two blocks should be close to $2\pi(t_b-t_a)/T_{rot}$ modulo $2\pi$. Because of the nature of the jump, we can only measure the reduced angle between ECC-block a and b and not the cumulative angle: after reading ECC-block a the drive skips a number of tracks, stabilizes to the right track and waits for ECC-block b to pass through the read-out unit. The essential point is that the drive does not loose the rotational phase during the jump, so the shorter the jump time and the more stable the rotation the more accurate the result will be.

If the drive does not operate in CAV mode but in CLV mode, the rotation period varies between ECC-block a and b. By measuring the rotation period at b immediately after the jump, we can get a handle at this, and for big jumps we have seen clear indications of the servo mechanism still stabilizing after the jump. For the time being, we simply use the average rotation period of a and b in calculating the reduced angle, and use statistical methods to estimate the maximum error in the result. We found a clear improvement when using the "average" result of the inward and outward jump direction: the systematic errors for large jumps partially cancel out. This allows us to use bigger jumps in CLV mode with still acceptable error.

We use statistical methods to estimate the errors in the reduced angle measurement. From the expression $2\pi(t_b-t_a)/T_{rot}$ modulo $2\pi$ for the measured reduced angle between a and b it follows that any error $\epsilon(T_{rot})$ in the rotational period translates into an error $2\pi(t_b-t_a)\epsilon(T_{rot})/T_{rot}^2$ in the measured reduced angle. The error in the rotational period has a systematic and a random contribution. The systematic contribution (as discussed above) can be estimated by the difference in the rotation period just before the jump and just after the jump, and the random contribution can be estimated by calculating the spread in the termination time differences $t_{i+1}-t_i$ found during measuring the rotation period, or by measuring the spread between locally repeated measurements. Any error $\epsilon(t_b-t_a)$ in the jump period simply translates into an additional error $2\pi\epsilon(t_b-t_a)/T_{rot}$ in the measured reduced angle, but because of the modulo $2\pi$ operation, the systematic and random contributions of the jump period are more easily evaluated by inspecting the measured reduced angle itself. Systematic errors jump period errors can be traced by comparing results for a jump from a to b with a jump from b to a. Random errors can be estimated by calculating the spread in repeated measurements.

If the maximum error in measured reduced angle exceeds a certain threshold, the measurement is considered unreliable and discarded. This technique works quite well in cleaning up the results, by automatically discarding measurements with read-problems, ECC-block ranges with less stable servo operation, and big jumps in CLV-mode.

In the previous two sections it was explained how to derive the reduced angle between ECC-block a and b from timing measurements. If the drive has tacho-angle information, it is straightforward to measure the reduced angles irrespective from CAV or CLV mode, and irrespective of jump distance. Here we describe how to fit the position model to a number of such reduced angle measurements. Obviously, we are looking for some sort of best fit to the measurements, e.g. in a least squares sense. One complication is the mildly non-linear relation $\Phi(l)$ between cumulative angle and bit string position as described with reference to FIG. 1. This means that we cannot use a simple least-square fit procedure, but have to use a non-linear fit procedure like the Levenberg-Marquardt method or some other non-linear optimization. But since the model is only slightly linear, and we already have a close to perfect parameter estimation to begin with, this causes no problems. A more serious complication stems from the fact that we can only measure the reduced angle $\phi(l)$ which unfortunately is a highly non-linear function of the bit string position. We have to make sure that the model is never more off than a fraction of a rotation, (in other words to make sure that we are never off by one or more full rotations). In that case, we simply calculate $\Delta\phi=\Delta\phi_{calculated}-\Delta\phi_{measured}$ and $\delta=\Delta\phi/2\pi-$Round($\Delta\phi/2\pi$) as the deviation for each measurement to be optimized in least square sense and avoid serious local optima.

With some math and/or straightforward calculations, we find that the total variation of the reduced angle stays within half a revolution for jumps of up to about 30 ECC-blocks distance. We measured the reduced angle of a jump over 16 ECC-blocks on a couple of positions spread out over the disc. We feed these measurements into a least square optimization of the position model using nominal values and nominal variations according to the DVD standard. This gives us an improved estimate of the physical model parameters. The actual improvement depends on the number of measurements and the accuracy of the measurements, but the fact that the measurement accuracy on reduced angle is now reliably transposed to the accuracy of the cumulative angle gives a clear gain in the model accuracy. So now that we know that we have an coarse estimate of the physical model parameters, we can do a series of measurements of larger jumps spread out over the disc, and refine our previous least squares estimate using a correspondingly smaller variation window to avoid the extra local minima that are caused by the larger jumps: larger jumps require better model knowledge to avoid mistakes of full revolutions, but larger jumps in turn provide more accurate information. In practice, we can for example double the jump size and halve the least squares search window for each iteration and thus quickly zoom in on a very accurate fit to the largest jumps that the measurement method provides. We have found excellent results.

Larger jumps give rise to a more accurate fit, but, as explained earlier, timing measurements to drives in CLV mode have a limited jump size. For CAV mode drives and for tacho-angle measurements the maximum jump size will be only limited by the ECC-block addressing range. The exponential growth in successive jump sizes is very powerful: e.g. for jump doubling it takes only 12 iterations to go from 16 ECC-blocks to the full range. A more detailed error analysis shows the relation between measurement accuracy and the maximum allowable enlargement factor of the jump size. Doubling only requires a measurement accuracy of about $\frac{1}{8}^{th}$ of a revolution, so in practice jump sizes could be more than doubled each iteration but that is hardly necessary. Fitting to a number of jumps spread out over the disc is a nice way of collecting data over the entire disc, even while the model is still relatively inaccurate. We are not fitting to a model of absolute ECC-block positions, but to a model of angle differences between ECC-blocks $\Delta\Phi_{calculated}(l, \Delta l)=\Phi(l+\Delta l)-\Phi(l)$ which is only weakly dependent on l and almost linear in $\Delta l$. This allows us to sample the entire disc area without risk of losing track of fall revolutions, and thus to obtain better estimates of all model parameters in each iteration, combined with some statistical averaging. Another approach would be to start with small jumps on one side of the disc and move with gradually growing jumps to the other side of the disc. This method is more complex because it does not allow accurate fitting of all position parameters simultaneously: a small range of ECC-block locations cannot give accurate information about all parameters in the model. So this requires more elaborate windowing of the model parameters. Many DVD discs are mastered with such stability that a two parameter model is sufficiently accurate for a visual label with negligible distortions. As mentioned before however, some discs show gradual deviations the two parameter model of several mm. Such deviations can be taken into account by adding one or more extra parameters to the model, or by adopting a piece-wise model. With some care for the additional freedom in the parameters of such models and the samples needed to obtain sufficient information on those parameters, the above described fitting method is easily generalized.

Instead of retrieving the parameter information by performing measurements on the record carrier, as discussed in detail with reference to FIGS. 5 to 7, it is also possible to retrieve this parameter information by reading it out. FIG. 8 shows schematically such an embodiment of the method according to the invention in which the parameter information is retrieved by reading out the parameter information via the Internet. In this embodiment, the record carrier 1 comprises a unique identifier UDI. This UDI can be present on the record carrier in different ways. It can for example be stored in a barcode present in the plastic inner ring or it can be stored in the lead-in in a wobbled pre-groove. It can also be stored in an integrated circuit present on the record carrier. This UDI is used for, via the Internet 64, retrieving the parameter information on a certain physical parameter from a database 65. After reading out the entry of the database belonging to the UDI, this parameter information is, via the Internet 64, communicated to the drive 66. This drive uses this parameter information for writing a label on the record carrier 1. To this end, this drive comprises means for retrieving label information, means for retrieving parameter information, in this embodiment by reading out database 65 via the Internet 64, and means for writing the label information on the optical disc using the parameter information.

The label to be written on the record carrier can be used for all kinds of different applications. The most obvious application is to use the disc label technique as a means of identification of recorded media for the end-user. Another application resides in the realm of copy protection. The label can then serve as a hard-to-copy visual watermark of the content.

The disc label can be written on different places of the disc. It can for example be placed after the regular data, either inside or outside the lead-out area, but it can also be positioned in an inner diameter ring, or in rings between the normal data. It is also possible to insert the label among the regular data area. In general, the label can be written on any possible place on the read-out side of the disc.

Although the invention has been elucidated with reference to the embodiments described above, it will be evident that other embodiments may be alternatively used to achieve the same object. The scope of the invention is therefore not limited to the embodiments described above.

It must also be noted that the invention is not limited to the use of parazmeter information relating to one physical parameter. In order to further optimize the writing process of the label, parameter information relating to different physical parameters can be combined. The inventors have found out that many DVD discs are mastered with such stability that the use of parameter information relating to two physical parameters can be sufficient for creating a visual label with negligible distortions. However, the use of parameter information relating to only one physical parameter can be sufficient for certain applications. For other applications, parameter information relating to more than two parameters might be required. The invention is also not limited to certain physical parameters. All physical parameters which can be used for determining the position of a certain bit on the record carrier belong to the scope of the claims. This includes, besides the physical parameters already mentioned, the exact amount of data per revolution or the number of revolutions on a disc. The invention is also not limited to certain recordable record carriers. All record carriers for which certain physical parameters are standardized can be used for writing such a label on the read-out side of the record carrier. The invention is also not limited to a method where the parameter information is retrieved by reading out the parameter information or retrieved by performing measurements on the record carrier. It is also possible to combine these in the method according to the invention, e.g. for verifying the correctness of the information.

It must further be noted that the term "comprises/comprising" when used in this specification, including the claims, is taken to specify the presence of stated features, integers, steps or components, but does not exclude the presence or addition of one or more other features, integers, steps, components or groups thereof It must also be noted that the word "a" or "an" preceding an element in a claim does not exclude the presence of a plurality of such elements. Moreover, any reference signs do not limit the scope of the claims; the invention can be implemented by means of both hardware and software, and several "means" may be represented by the same item of hardware. Furthermore, the invention resides in each and every novel feature or combination of features.

The invention can be summarized as follows: A method for writing a label on a recordable record carrier, the record carrier adhering to a pre-defined, standardized condition with respect to a physical parameter, characterized in that the method comprises the following steps: retrieving label information, retrieving parameter information on the physical parameter, which parameter information is of a higher precision than the precision of the physical parameter mentioned in the pre-defined, standardized condition, writing the label information on the optical disc using the parameter information. The invention further relates to a device for performing the method. Due to the fact that the standard specifications for recordable and rewritable media only specify physical parameters to a certain precision, small errors in one of these parameters will cause a significant distortion in the label to be written on the record carrier. The invention is aimed at overcoming this problem. Retrieving parameter information on the physical parameter with a higher precision than the precision of the physical parameter mentioned in the pre-defined, standardized condition enables writing such a label. Using this parameter information the entire mapping of the channel bits over the record carrier and thus where the written visible image pixels data making up the label end up on the record carrier can be determined.

The invention claimed is:

1. Method for writing a label on a recordable record carrier, the record carrier adhering to a pre-defined, standardized condition with respect to a physical parameter that is utilized for writing data onto tracks of the recordable record carrier, the method comprising acts of:
   retrieving label information,
   retrieving parameter information on the physical parameter, which parameter information is of a higher precision than the precision of the physical parameter,
   converting the label information into label data configured for writing along the tracks of the recordable record carrier along with other data stored on the record carrier,
   writing the label information along the tracks of the record carrier using the parameter information.

2. The method according to claim 1, wherein the record carrier has a circular form, wherein of the act of converting the label information comprises an act of converting the label information to a polar format.

3. The method according to claim 1, wherein the parameter information is retrieved by reading out the information.

4. Method according to claim 3, wherein the parameter information is read out from the record carrier.

5. The method according to claim 3, wherein the record carrier comprises a unique identifier, wherein retrieving the parameter information of the record carrier comprises acts of:
   reading out the unique identifier, and
   reading out the parameter information from a database using the unique identifier.

6. The method according to claim 5, wherein the database is read out via the Internet.

7. The method according to claim 1, wherein the parameter information is retrieved by performing measurements on the record carrier.

8. The method according to claim 7, wherein the measurements comprise angle measurements from the inner radius of the recordable record carrier to determine a writing angle for the label information.

9. The method according to claim 8, wherein the angle measurements comprise angular distance measurements along a track of the recordable record carrier and that the parameter information is retrieved by fitting to the angular distance measurements.

10. The method according to claim 9, wherein the angular distance measurements are based on tacho information.

11. The method according to claim 9, wherein the angular distance measurements are based on timing measurements.

12. The method according to claim 9, wherein the eccentricity of the record carrier is determined and the angular distance measurements are based on the eccentricity.

13. A device for writing a label on a recordable record carrier, the record carrier adhering to a pre-defined, standardized condition with respect to a physical parameter that is utilized for writing data along tracks of the recordable record carrier, the device comprising:
   means for retrieving label information,
   means for retrieving parameter information, which information is of a higher precision than the precision of the physical parameter,
   means for converting the label information into label data for writing along the tracks of the recordable record carrier along with other data stored on the record carrier, and
   means for writing the label information along the tracks of the record carrier using the parameter information.

* * * * *